April 24, 1934.  A. P. WIEGAND  1,956,055
AIRCRAFT PROPELLER
Filed Jan. 13, 1930   2 Sheets-Sheet 2

Albert P. Wiegand
Inventor
by Smith and Freeman
Attorneys

Patented Apr. 24, 1934

1,956,055

UNITED STATES PATENT OFFICE 1,956,055

AIRCRAFT PROPELLER

Albert P. Wiegand, Pittsburgh, Pa.

Application January 13, 1930, Serial No. 420,378

55 Claims. (Cl. 170—162)

This invention relates to aircraft propellers, and has for its object the provision of a simple and reliable construction whereby variable pitch of the blades is automatically obtained depending upon the ratio between the propeller thrust and engine torque, so as to operate always nearest to that point where efficient performance is secured.

A further object of the invention is the provision of connections between oppositely disposed rotatably mounted blades which take up end thrusts and permit free rotation of the blades.

A still further object of the invention is the provision of connections between the blades of the character referred to, which under influence of centrifugal force, tend to rotate the blades in a predetermined direction.

Another object of the invention is the provision of inter-engaging members carried by the propeller and blades for limiting longitudinal and rotational movement of the blades, and which in event of failure of operating parts, insure safe performance of the propeller.

Other objects and advantages of the invention will more fully be set forth and described in the specification and claims hereinafter following.

In the drawings accompanying and forming a part of this application.

As shown in the drawings my improved propeller comprises a hub 10 having radially extending hollow arms 11—11, in each of which is rotatably seated the base portion 12 of a blade 13, the hub being keyed as indicated at 14, to the engine shaft 15. The entire hub preferably comprises a single forging, with the arms 11—11 integral therewith. Each of said arms has an inner section 16 tapered outwardly from the hub, and an offset outer enlarged annular section 17, said sections defining a socket having a bottom wall 18 forming part of the hub of the propeller. The arms 11—11 are identical in construction except for their opposite disposition, and the socket in each of the arms is adapted for the reception of one of the blades 13.

The blades 13 have similar base portions, each provided with a tapered end section 19 rotatably disposed in the tapered section 16 of the socket, and an enlarged portion 20, exteriorly threaded as indicated at 21, for the reception of a threaded sleeve 22. The sleeve 22 is provided with an annular shoulder 23, and the inner portion of the sleeve is accommodated within the enlarged section 17 of the arm 11. A suitable washer 24 is preferably interposed between the inner surfaces of the shoulder 23 and the outer annular edge of the section 17 of the arm 11. An annular dust ring 25 is carried by the shoulder 23 of the sleeve and extends over the adjacent end of the section 17 of the arm 11.

Interposed between the sleeve 22 and the adjacent wall of the arm 11 are roller bearings 26, which extend longitudinally of the arm 11. The bearings 26 are accommodated in a race 27, bear upon the sleeve 22, are free to move outwardly, but are limited in inward movement by the shoulder 28. At its inner end the tapered base portion 19 of the blade is reduced as indicated at 30, for the reception of a race ring 31, cooperating with a race ring 32 carried by the hub 10, and between which are interposed anti-friction rollers 33, which also are free to partake of longitudinal movement. The tapered portion 19 has a centrally disposed socket 34 in which is mounted a spring 35 bearing upon the bottom wall 18 of the socket, and tending to force the blade base in an outward direction.

Outwardly of the shoulder 23, each of the blade bases carries a steel ring 36, said ring bearing against the shoulder 23 of the sleeve 22 and tightly clamped on the blade base. Integral with each of the rings 36 at opposite sides, along the circumferential periphery thereof, are radially disposed spaced studs or projections 37, each of the studs or projections having a threaded socket in its end for the reception of threaded retaining members 38. Each of the studs or projections is adapted to rotatably accommodate a bushing 39, and each bushing 39 has disposed thereabout the looped end 40 of a connecter cable or link 41, the opposite end of each connecter or link 41 having a looped end disposed about a bushing carried by the ring associated with the oppositely disposed blade. As many of the connecters or links 41 may be utilized as desired, there preferably being four at each side of the hub. These connecters or links serve to take up all of the centrifugal stresses which tend to throw the blades radially outward from the hub, the roller bearings 26 and 33 taking up the lateral stresses and insuring free rotation, and being movable in a longitudinal direction as necessary. The links or connecters 41 may be of any suitable character, but preferably comprise twisted strands of piano wire, which insure great strength combined with a substantial minimum of longitudinal extensibility.

The blades 13 are of such character that in operation of the propeller, air pressure upon the blades tends to rotate the same in a direction to reduce the pitch of the blades; this is preferably brought about by constructing the retreating margin of each blade, so that it extends further from the longitudinal axis of the base than the remaining margin, so that the unbalanced effect of the air upon the blade is to tend to rotate the blade in its socket in a direction to reduce or decrease the pitch angle of the blade.

Formed in the socket of each of the tapered portions of the arms 11—11 is a transverse slot 42, through which projects a pin or stud 43 which is screwed into the base 13 of the blade. The outer extremity of each of the studs 43 is formed with an enlarged spherical head 44, rotatably received in a socket 45, carried by one of the radial arms 46 formed on a sleeve 47 rotatably mounted on the exterior of the hub 10, the other arm 46 of the sleeve 47 being connected with the stud 43 of the opposite blade. By reason of this construction whenever one of the studs 43 is moved along its slot, the other stud is constrained to move therewith, thereby obtaining equalized movement of the blades.

Projecting from each of the tapered sections 16 of the arms 11—11 is a lug 48 which carries a hollow cylindrical sleeve 49 threaded both internally and externally. The end of this sleeve extends not further than the nearest edge of the slot 42, and opposite the end of the sleeve 49 the shank of the stud 43 is flattened and widened as shown at 50. Adjustably screwed on the exterior of the sleeve 49 is a nut 51 between which, and the flattened portion 50, is interposed a coil spring 52; and adjustably screwed inside the sleeve 49 is a stop screw 53. Partly for purposes of symmetry, and partly for manufacturing convenience I have shown a second lug 54 carried by each of the sections 16 of the arms 11—11, provided with a second set screw 55 to constitute a movable abutment for the stud 43.

The angular extent of the blade movement is not very great. The length of the slots 42 is preferably made so slight as still to afford a practicable amount of propeller thrust at either limit of movement, thus preventing any failure of operation of the aircraft despite the breakage of the springs or other parts. The studs 43 are made relatively large, and the slots 42 of somewhat greater width than the diameter of the studs. In this way necessary longitudinal movement of the blade bases is permitted, and in event of simultaneous breakage of the links 41, the studs or pins 43 are of such strength as to prevent the blades being thrown from the hub.

Figures 1, 5:
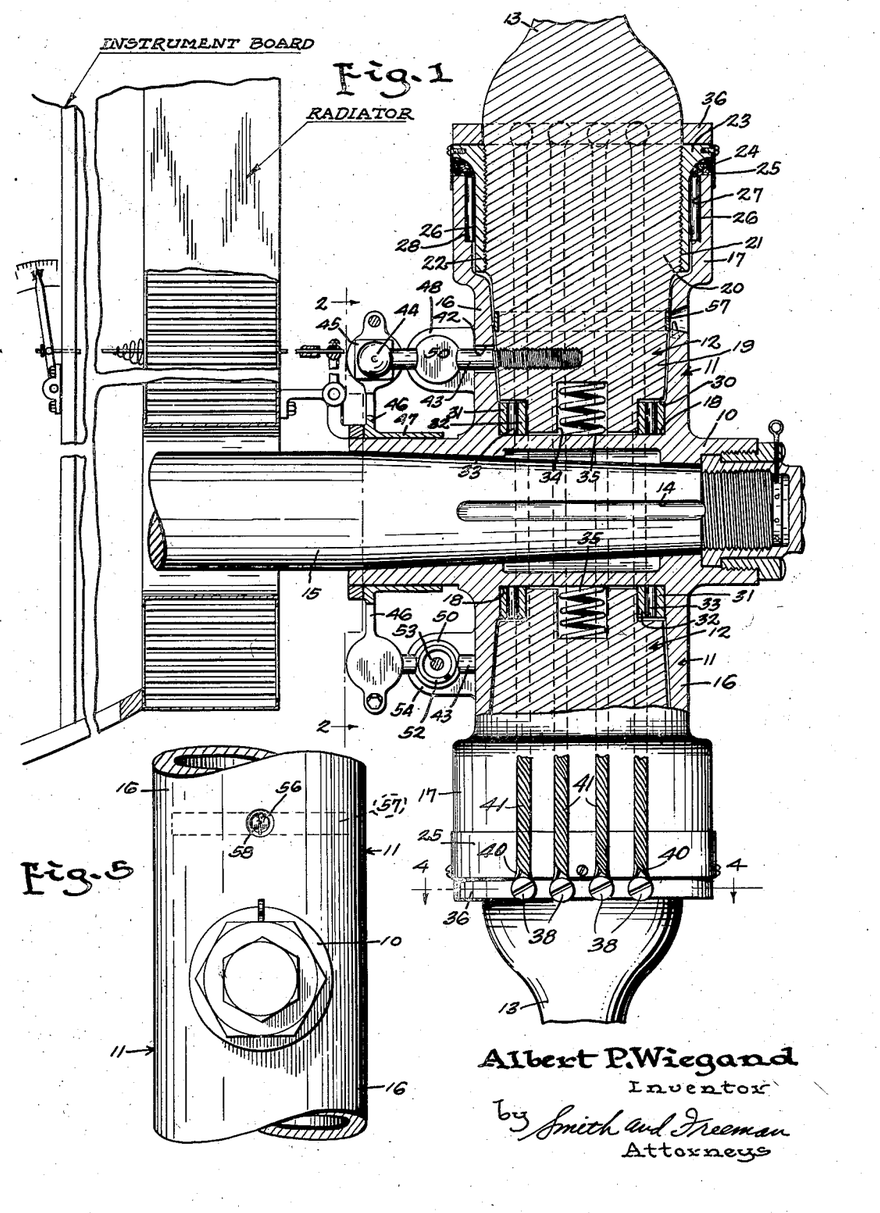
Figure 1 is a longitudinal sectional view through the improved propeller, showing parts thereof in elevation.
Figure 5 is a partial front elevation of indicating means used in connection with my improved propeller.
Figure 2:
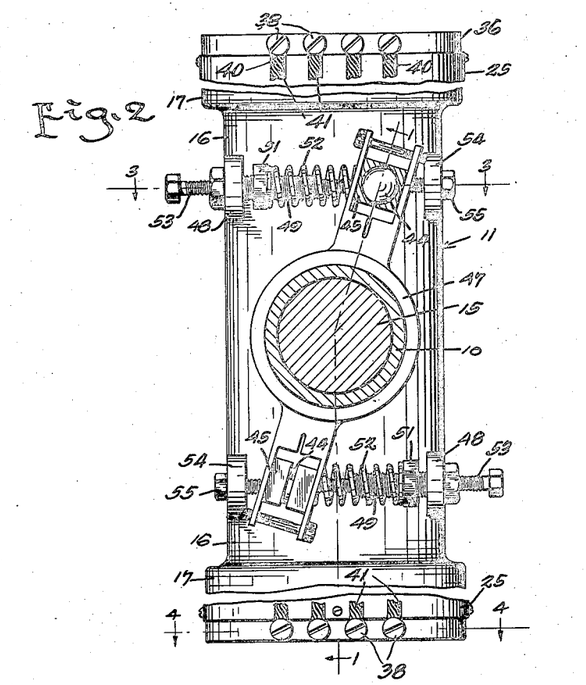
Figure 2 is a vertical sectional view corresponding to the line 2—2 of Figure 1.
Figures 3, 4:
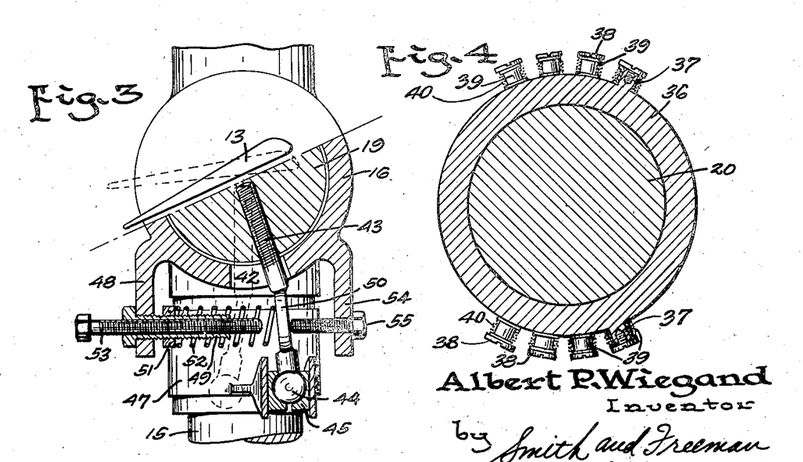
Figure 3 is a sectional view corresponding to the line 3—3 of Figure 2.
Figure 4 is a horizontal sectional view corresponding to the line 4—4 of Figure 2.

It is desirable that the angularity or pitch of the blades may be visually indicated, and to this end I provide in one of the arms 11 a tapered opening 56 disposed in line with an annularly disposed ring having a scale 57 calibrated in degrees, as indicated at 58, rotation of the blade bases varying the reading in accordance with the pitch variation of the blades.

In operation, in the form of the invention herein described, the blades 13—13 are normally maintained at the maximum pitch with the links 41 substantially parallel with the plane of rotation of the blades. This may be accomplished entirely through the agency of the springs 35, which tend to straighten or bring parallel the links 41 with reference to the plane of rotation; however it is desired to have the springs 52 assist in this function. Upon initial rotation of the propeller the unequal resistance of the air upon the asymmetrically formed blades tends to rotate them in opposite directions to decrease the angle of pitch; this movement is permitted by the links 41 and the bushings 39, the latter rotating on the studs 37, and by longitudinal movement of the blade bases toward each other compressing the springs 35. This movement, toward decreased pitch, is resisted both by the springs 35 tending to straighten the links, that is, dispose the same substantially parallel with respect to the plane of rotation, and is further resisted by the tendency of the links, under the action of centrifugal force, to assume straightened positions substantially parallel with respect to the plane of rotation. When the speed of rotation of the propeller is increased the centrifugal force exerted upon the links 41 becomes correspondingly greater and a point is then reached where the forces of the air tending to decrease pitch, and the centrifugal forces upon the links 41, in conjunction with those of the springs 35, are equalized. The resistance of the links 41 and springs 35 to rotation of the blades toward decreased pitch position, is augmented by resistance of the springs 52, and although these latter springs could be omitted, it is deemed desirable to provide the same. When speed is reduced, and the air pressure upon the blades correspondingly reduced, the blades will tend to return to maximum pitch under the influence of the springs 35, assisted by the springs 52, again disposing the links 41 substantially parallel with the plane in which the propeller revolves. Through provision of the means described, the pitch of the blades is automatically varied depending upon the ratio between propeller thrust and engine torque, so that efficient operation is thereby obtained; free rotation of the blades is assured by doing away with end thrust bearings; and entire safety obtained in event of failure of any or all of the regulating parts.

While I have herein shown a preferred embodiment of my invention it will be apparent to those skilled in the art that variations and changes may be made without departing from the spirit of the invention, and it will be understood that all of such changes and variations form part of my invention.

Having thus described my invention what I claim is:

1. In an aircraft propeller, a hub having radially extending hollow arms providing sockets, oppositely disposed blades asymmetric with respect to the longitudinal axes of said blades, and tending to rotate said blades in a predetermined direction, said blades having base portions disposed in said sockets and adapted to have limited rotational and endwise movement therein, and connecting means extending between the base portions of said blades, said connecting means comprising links normally disposed substantially parallel with the longitudinal axes of said blades and flexibly mounted to permit tilting at an angle to normal position upon rotation of said blades in said predetermined direction, and yieldable means urging said blades longitudinally apart and thereby exerting force tending to straighten said means and return said blades to normal position.

2. In an aircraft propeller, a hub having radially extending hollow arms providing sockets, oppositely disposed blades having base portions disposed in said sockets and adapted to have limited rotational and endwise movement therein, said blades being asymmetric and under the influence of air pressure thereon tending to assume a decreased pitch angle, and external inextensible connecting means tying the base portions of said blades together outside of said hub blades against radial movement due to centrifugal force; spring means opposing rotation of said blades toward decreased pitch angle position; and means urging said blades longitudinally apart.

3. In an aircraft propeller, a hub having radially extending hollow arms providing sockets, oppositely disposed blades having base portions diposed in said sockets and adapted to have limited rotational and endwise movement therein, each of said base portions having a ring fixedly secured thereto and provided with spaced radial projections thereon, and connecting links substantially parallel to each other extending between the rings of opposed blades and having looped ends disposed about said projections, said links maintaining the base portions of said blades in said sockets against outward endwise stresses, yet permitting rotation of said base portions.

4. In an aircraft propeller, a hub having radially extending hollow arms providing sockets, oppositely disposed blades having base portions disposed in said sockets and adapted to have limited rotational and endwise movement therein each of said base portions having a ring fixedly secured thereto and provided with spaced radial projections thereon, lateral thrust anti-friction bearings for permitting free rotation of the blade bases in said sockets, said bearings being free to move radially with respect to said hub dependent upon endwise movement of said blade base portions, and connecting links extending between the rings on said base portions of said blades and having looped ends disposed about said projections, said links maintaining the base portins of said blades in said sockets against outward endwise stresses, yet permitting rotation of said base portions.

5. In an aircraft propeller, a hub having radially extending hollow arms providing sockets, oppositely disposed blades asymmetrical with respect to the longitudinal axis of each blade tending to rotate said blades in a predetermined direction away from a predetermined normal position, said blades having base portions disposed in said sockets and adapted to have limited rotational and endwise movement therein, connecting means extending between the base portions of said blades, said connecting means comprising links normally disposed substantially parallel with the longitudinal axes of said blades and flexibly mounted to permit tilting at an angle to normal position upon rotation of said blades in said predetermined direction, said links, under the influence of centrifugal force during rotation of the propeller exerting influence upon said blades tending to return them to normal position; and yieldable means urging said blades longitudinally apart and thereby exerting additional force on said blades tending to urge the same to normal position.

6. In an aircraft propeller, a hub having radially extending hollow arms providing sockets, oppositely disposed blades asymmetrical with respect to the longitudinal axis of each blade tending to rotate said blades in a predetermined direction away from a predetermined normal position, said blades having base portions disposed in said sockets and adapted to have limited rotational and endwise movement therein, connecting means extending between the base portions of said blades, said connecting means comprising links normally disposed substantially parallel with the longitudinal axes of said blades and flexibly mounted to permit tilting at an angle to normal position upon rotation of said blades in said predetermined direction, said links, under the influence of centrifugal force during rotation of the propeller, exerting influence upon said blades tending to return said blades to normal position; and yieldable means disposed in the path of rotation of the bases of said blades for opposing rotation of said blade bases away from normal position.

7. In an aircraft propeller, a hub having radially extending hollow arms providing sockets, oppositely disposed blades asymmetrical with respect to the longitudinal axis of each blade tending to rotate said blades in a predetermined direction away from a predetermined normal position, said blades having base portions disposed in said sockets and adapted to have limited rotational and endwise movement therein, connecting means extending between the base portions of said blades, said connecting means comprising links normally disposed substantially parallel with the longitudinal axes of said blades and flexibly mounted to permit tilting at an angle to normal position upon rotation of said blades in said predetermined direction, said links, under the influence of centrifugal force during rotation of the propeller exerting influence upon said blades tending to return them to normal position, yieldable means urging said blades longitudinally apart, and yieldable means disposed in the path of rotation of the bases of said blades for opposing rotation in a direction out of normal position.

8. In an aircraft propeller, a hub having radially extending hollow arms providing sockets, oppositely disposed blades asymmetrical with respect to the longitudinal axis of each blade and tending to rotate said blades in a predetermined direction away from a predetermined normal position, said blades having base portions disposed in said sockets and adapted to have limited rotational and endwise movement therein, connecting means extending between the base portions of said blades for maintaining the latter in said sockets against outward endwise stresses, yet permitting rotation of said base portions, said connecting means comprising links normally disposed substantially parallel with the longitudinal axes of said blades and flexibly mounted to permit tilting at an angle to normal position upon rotation of said blades in said predetermined direction, said links, under the influence of centrifugal force during rotation of the propeller exerting influence upon said blades tending to return them to normal position.

9. In an aircraft propeller, a hub having radially extending hollow arms providing sockets, oppositely disposed blades asymmetrical with respect to the longitudinal axis of each blade and tending to rotate said blades in a predetermined direction away from a predetermined normal position, said blades having base portions disposed in said sockets and adapted to have limited rotational and endwise movement therein, connecting means extending between the base portions of said blades for maintaining the latter in said sockets against outward endwise stresses, yet permitting rotation of said base portions, said connecting means comprising links normally disposed substantially parallel with the longitudinal axes of said blades and flexibly mounted to permit tilting at an angle to normal position upon rotation of said blades in said predetermined direction, said links, under the influence of centrifugal force during rotation of the propeller exerting influence upon said blades tending to return them to normal position, and yieldable means disposed in the path of rotation of the bases of said blades for opposing rotation in a direction away from normal position.

10. An aircraft propeller comprising a hub formed with oppositely projecting, aligned radial sockets, blades having shanks rotatably and slidably mounted in said sockets, and plural, straight, substantially inextensible parallel tension members connecting said blades together outside said sockets, said blades being asymmetric relative to the axes of their blade shanks so as to exhibit a turning movement due to the air pressure thereon which is opposed to that component of the force along said tension members which is tangent to said blade shanks.

11. An aircraft propeller comprising a hub formed with oppositely projecting, aligned radial sockets, blades having shanks rotatably and slidably mounted in said sockets, a ring surrounding each blade shank beyond its socket and angularly adjustable relative thereto, and plural, straight, substantially inextensible parallel tension members connecting said rings past the exterior of said hub, so as to resist any separating movement of said blades due to centrifugal force and to resist any relative rotation of said blades in their sockets.

12. An aircraft propeller comprising a hub formed with oppositely projecting, aligned radial sockets, blades having shanks rotatably and slidably mounted in said sockets, and plural, straight, substantially inextensible tension members connecting said blades together past the exterior of said hub so as to resist any separating movement of said blades due to centrifugal force and to resist any relative rotation of said blades in their sockets, and an equalizing device pivoted to said hub and operatively connected to both blade shanks and causing the same to rotate equally in their respective sockets.

13. An aircraft propeller comprising a hub formed with oppositely projecting, aligned radial sockets, blades having shanks rotatably and slidably mounted in said sockets, plural, straight, substantially-inextensible, tension members located outside said hub and substantially parallel to the common axes of said sockets and having their ends rigidly secured to the respective blades so as to prevent separating movement thereof due to centrifugal force, and balanced springs forcing said blades outwardly at all times and maintaining said members under tension.

14. An aircraft propeller comprising a hub formed with oppositely projecting, aligned radial sockets, blades having shanks located one in each socket, roller bearings located in each socket and mounting the respective shanks therein for both axial and rotatable movement, a spring tending to push each blade-shank out of its socket, and a plurality of straight, substantially-inextensible, tension members located outside said hub and substantially parallel to the common axis of said sockets and having their ends rigidly secured to said blades so as to prevent separating movement thereof either by said springs or by centrifugal force, each of said blades being asymmetric relative to the axis of its shank.

15. An aircraft propeller comprising a hub formed with oppositely projecting, aligned radial sockets, blades having shanks axially and rotatably movable, one in each socket, an equalizing yoke pivoted to the exterior of said hub and having arms operatively connected, one to each shank, and a plurality of straight, substantially-inextensible, tension members, located outside said hub and substantially parallel to the common axis of said blade-shanks and having their ends firmly attached to said blades so as to prevent separating movement under centrifugal force and to oppose rotation thereof with a component of that force.

16. In an aircraft propeller, a hub having radially extending hollow arms providing sockets, asymmetric blades having base portions disposed in said sockets and adapted to have limited rotational and endwise movement therein, said blades normally being disposed to provide a predetermined maximum pitch angle of said blades with respect to said hub, and connecting means normally disposed substantially parallel with the longitudinal axes of said blades, and extending outside of said sockets, connecting said blades to said hub, and mounted to permit rotation of said blades toward decreased pitch angle, said connecting means, under influence of centrifugal force during rotation of the propeller, tending to return said blades toward their increased pitch angle.

17. In an aircraft propeller, a hub having radially extending hollow arms providing sockets, blades having base portions disposed in said sockets and adapted to have limited rotational and endwise movement therein, and connecting means normally disposed substantially parallel with the longitudinal axes of said blades, and extending outside of said sockets, connecting said blades to said hub, studs fixedly secured to said blade bases, and an equalizer device operatively connected to said studs to obtain equalized movement of said blades.

18. A variable pitch propeller having a hub provided with radially disposed extensions, blades rotatably supported by said extensions, said blades each having a greater area at one side of the longitudinal axis thereof than upon the other, the greater areas of said blades during operation tending to rotate said blades to change the pitch angle thereof, means opposing rotation of said blades thus occurring, and elongated thrust transmitting elements for anchoring said blades to said hub, said elements acting independently to entirely take up centrifugal stresses tending to throw said blades from said hub, yet being flexibly mounted to permit rotatable movements of said blades.

19. A variable pitch propeller having a hub provided with radially disposed extensions, blades rotatably supported by said extensions, said blades each having a greater area at one side of the longitudinal axis thereof than upon the other, the greater areas of said blades during operation tending to rotate said blades to change the pitch angle thereof, spring means opposing rotation of said blades thus occurring, and elongated thrust transmitting elements for anchoring said blades to said hub, said elements acting independently to entirely take up centrifugal stresses tending to throw said blades from said hub, yet being flexibly mounted to permit rotatable movements of said blades.

20. A variable pitch propeller having a hub provided with radially disposed extensions, blades rotatably supported by said extensions, said blades each having a greater area at one side of the longitudinal axis thereof than upon the other, the greater areas of said blades during operation tending to rotate said blades to change the pitch angle thereof, means opposing rotation of said blades thus occurring, and elongated thrust transmitting elements for anchoring said blades to said hub, said elements being arranged exteriorly of said hub, and acting independently to entirely take up centrifugal stresses tending to throw said blades from said hub, yet being flexibly mounted to permit rotatable movements of said blades.

21. A variable pitch propeller having a hub mounted on a drive shaft, and provided with radially disposed extensions, blades rotatably supported by said extensions, said blades each having a greater area at one side of the longitudinal axis thereof than upon the other, the greater areas of said blades during operation tending to rotate said blades to change the pitch angle thereof, means opposing rotation of said blades thus occurring, and elongated thrust transmitting elements for anchoring said blades to said hub, said elements being arranged to by-pass said drive shaft and operable to take up centrifugal stresses tending to throw said blades from said hub, yet being flexibly mounted to permit rotatable movements of said blades.

22. A variable pitch propeller having a hub provided with radially disposed extensions, blades rotatably supported by said extensions, said blades each having a greater area at one side of the longitudinal axis thereof than upon the other, the greater areas of said blades during operation tending to rotate said blades to change the pitch angle thereof, spring means disposed parallel to the plane of rotation of said blades and opposing the rotation of said blades thus occurring, and elongated thrust transmitting elements for anchoring said blades to said hub, said elements acting independently to entirely take up centrifugal stresses tending to throw said blades from said hub, yet being flexibly mounted to permit rotatable movements of said blades.

23. A variable pitch propeller having a hub provided with radially disposed extensions, blades rotatably supported by said extensions, spring means normally maintaining said blades at maximum pitch and opposing the rotation of said blades toward reduced pitch, and elongated thrust transmitting elements for anchoring said blades to said hub, said elements acting to entirely take up centrifugal stresses tending to throw said blades from said hub, yet being flexibly mounted to permit rotatable movements of said blades to reduced pitch.

24. A variable pitch propeller having a hub provided with radially disposed extensions, blades rotatably supported by said extensions, means opposing rotation of said blades, elongated thrust transmitting elements for anchoring said blades to said hub, said elements being arranged to by-pass said hub and operable independently to entirely take up centrifugal stresses tending to throw said blades from said hub, yet being flexibly mounted to permit rotatable movements of said blades, and means for moving said blades radially with respect to said hub.

25. A variable pitch propeller having a hub provided with radially disposed extensions, blades rotatably supported by said extensions, means opposing rotation of said blades, elongated thrust transmitting elements for anchoring said blades to said hub, said elements being arranged exteriorly of said hub and operable independently to entirely take up centrifugal stresses tending to throw said blades from said hub, yet being flexibly mounted to permit rotatable movements of said blades, and means for moving said blades radially with respect to said hub.

26. A variable pitch propeller having a hub provided with radially disposed extensions, blades rotatably supported by said extensions, said blades each having a greater area at one side of the longitudinal axis thereof than upon the other, the greater areas of said blades during operation tending to rotate said blades to change the pitch angle thereof, means opposing rotation of said blades thus occurring, elongated thrust transmitting elements for anchoring said blades to said hub, said elements acting independently to entirely take up centrifugal stresses tending to throw said blades from said hub, yet being flexibly mounted to permit rotatable movements of said blades, and means operable to exert pressure at the ends of said blades to cause limited rotation of said blades.

27. A propeller for the purpose described, comprising: a hub; a plurality of blades rotatable about their longitudinal axes in said hub; said blades being asymmetric relative to their longitudinal axes so that the unbalanced air pressure due thereto and developed as a result of rotating said propeller, provides a force tending to rotate said propellers about said axes; spring means operable to oppose the rotation of said blades thus occurring; means affected by centrifugal force, operable to take up centrifugal stresses tending to throw said blades from said hub; and means operable radially with respect to said hub for moving said blades radially.

28. A variable pitch propeller having a hub provided with radially disposed extensions, blades rotatably supported by said extensions, spring means opposing rotation of said blades, elongated thrust transmitting elements for anchoring said blades to said hub, said elements being arranged outside of said hub and operable independently to entirely take up centrifugal stresses tending to throw said blades from said hub, yet being flexibly mounted to permit rotatable movements of said blades, and spring means for moving said blades radially with respect to said hub.

29. A variable pitch propeller comprising a hub having a bore extending therethrough to accommodate a driving shaft, and having tubular radially disposed extensions providing sockets terminating short of the driving shaft bore, blades each having a solid butt rotatably disposed in one of said sockets and substantially occupying the entire space therein, elongated thrust transmitting elements extending longitudinally with respect to said radial extensions and with respect to said blades for anchoring said blades to said hub, said elements being arranged exteriorly of the hub butts and operable to take up the entire centrifugal stresses tending to throw said blades from said hub, yet permitting rotation of said blades in the hub sockets, and means for rotating said blades to change the pitch angle thereof.

30. In an aircraft propeller a hub having radial hollow arms providing sockets, blades having base portions journaled in said sockets transversely of the hub-axis, said blades being asymmetric with relation to the axes of their respective sockets, interfitting projections and abutments carried by said arms and their respective blade-bases whereby the rotation of said blades is restricted between limits of greater and smaller positive torque, a separate spring associated with each blade, said springs bearing in opposite directions and opposing the rotation of said blades by the unbalanced pressure of the air on opposite sides of their axes, and mechanical connections between said bases outside of the hub whereby said blades are forced to turn simultaneously in their sockets.

31. A propeller for aircraft comprising a hub having radial arms providing sockets, blades having bases journaled in said sockets, the retreating margin of each blade being located further from the axis of the corresponding socket than the advancing margin of that blade, whereby the air pressure due to the propeller rotation shall tend to reduce the angularity of the blade, a separate spring carried by and rotatable with each arm and operatively connected to the corresponding base in a manner to tend to increase the angularity of the blade, a sleeve rotatably mounted on the exterior of said hub and having arms projecting therefrom, and connections between each arm and a part of each blade whereby said blades are compelled to turn about their axes simultaneously.

32. A propeller for aircraft comprising a hub having radial arms providing sockets, blades having bases journaled in said sockets, the retreating margin of each blade being located further from the axis of the corresponding socket than the advancing margin of that blade, whereby the air pressure due to the propeller rotation shall tend to reduce the angularity of the blade, a separate spring carried by and rotatable with each arm and operatively connected to the corresponding base in a manner to tend to increase the angularity of the blade, an equalizing member rotatably journaled on the exterior of said hub, and connections between said member and each of said bases whereby said blades are caused to turn simultaneously in their sockets.

33. A propeller for aircraft comprising a hub having radial hollow arms defining sockets and having slots in their walls, blades having bases journaled in said sockets, the margins of each blade being asymmetrically located with respect to the axis of the corresponding socket whereby the unbalanced force of the air on each blade tends to rotate the same about such axis, rigid members carried by said bases and projecting through said slots, rigid lugs carried by said arms, and springs interposed between said lugs and members to oppose the turning of said blades by the air pressure.

34. A propeller for aircraft comprising a hub having radial hollow arms defining sockets and having slots in their walls, blades having bases journaled in said sockets, the margins of each blade being asymmetrically located with respect to the axis of the corresponding socket whereby the unbalanced force of the air on each blade tends to rotate the same about such axis, rigid members carried by said bases and projecting through said slots, an equalizing member rotatably journaled on the exterior of the hub and articulated to said rigid members to cause the blades to move together in their sockets, and springs tending to turn said blades in the opposite direction to the force of the air.

35. A propeller for aircraft comprising a hub having radial hollow arms defining sockets and having slots in their walls, blades having bases journaled in said sockets, the margins of each blade being asymmetrically located with respect to the axis of the corresponding socket whereby the unbalanced force of the air on each blade tends to rotate the same about such axis, rigid members carried by said bases and projecting through said slots, an equalizing member rotatably journaled to said hub upon an axis which coincides with the hub axis, means operatively connecting said member to said bases, and a separate spring also operatively connected to each base tending to turn said blades in the opposite direction from which the air tends to turn them.

36. A propeller for aircraft comprising a hub having radial hollow arms defining sockets and having slots in their walls, blades having bases journaled in said sockets, the retreating margin of each blade being located further from the axis of the corresponding socket than the advancing margin of that blade, whereby the air pressure due to the propeller rotation shall tend to reduce the angularity of the blade, equalizing mechanism located exteriorly of said hub and operatively connecting said bases together whereby they are forced to turn simultaneously in their sockets, and springs also located exteriorly of said hub and independently connected to said bases in a manner to tend to increase the angularity of the blades.

37. In an aircraft propeller a metallic hub adapted for attachment to an engine shaft and having a pair of radial arms, blades pivoted to said arms upon axes which are transverse to the axis of said shaft, the retreating margin of each blade being located further from the pivot axis of that blade than the advancing axis whereby the air pressure shall tend to rotate the blade in a direction to decrease its slant, an equalizing member rotatably journaled upon the exterior of said hub and operatively connected to each blade whereby they are compelled to turn simultaneously about their respective axes, separate spring members operatively connected to said blades and tending to turn them about their pivot axes in a direction to increase their slant, and means for positively arresting such turning of said blades between predetermined limits within which positive thrust is secured.

38. In an aircraft, a propeller having a hub formed with radial sockets, angularly adjustable blades having shanks rotatably mounted in said sockets, rigid headed members secured to said blade-shanks and having spherical heads located outside of said sockets, a rotatable sleeve mounted upon the exterior of said hub, and having radial arms for each of said headed members, said last-named arms having radial slide-ways therein, and sliding shoes movably mounted in said slide-ways, said shoes having spherical recesses receiving said spherical heads, a fixed abutment on each of said sockets extending intermediate the adjacent socket and the adjacent headed member, and yieldable means interposed between each abutment and each headed member.

39. A propeller for aircraft comprising a hub having radial arms providing sockets, the sides of said arms having slots therein, blades having bases journalled in said sockets, rigid members carried by said bases and projecting through said slots, a rotatably mounted member movable relatively with respect to said hub upon rotation of said blades about their axes, and arms carried by said rotatable member articulated to said rigid members, whereby rotation of any one of said blades effects relative movement of said rotatable member with respect to said hub, to cause said blades to rotate simultaneously about their axes.

40. A propeller for aircraft comprising a hub having radial arms providing sockets, the sides of said arms having slots therein, blades having bases journalled in said sockets, rigid members carried by said bases and projecting through said slots, said members having spherical heads, a rotatable sleeve carried by the exterior of said hub coaxial with the hub axis and having radial slots, and shoes slidable in said slots, said shoes defining spherical cavities in which said heads are received.

41. A propeller for aircraft comprising a hub having radial arms providing sockets, the sides of said arms having slots therein, blades having bases journalled in said sockets, rigid members carried by said bases and projecting through said slots, a rotatable sleeve carried by the exterior of said hub coaxial with the hub axis, arms carried by said sleeve articulated to said members to maintain said blades in similar angular position, fixed arms carried by said sockets, and a spring interposed between each of said last-named arms and one of said members and tending to turn the corresponding blade in its socket.

42. A propeller for aircraft comprising a hub, having a bore extending axially entirely therethrough for the accommodation of a driving shaft, operable to rotate said propeller, blades journaled to said hub upon axes transverse to the hub-axis, the retreating margin of each blade being located further from the axis of the blade base than the advancing margin of that blade, whereby the air pressure due to the propeller rotation shall tend to reduce the angularity of the blade, a separate spring for each blade, carried by and rotatable with said hub and operatively connected to the corresponding blade base in a manner to to tend to increase the angularity of the blade, means positively arresting the rotation of said blade bases between predetermined limits, a rocker device pivoted to said hub on an axis parallel to the hub-axis, and connections between said rocker and said blade bases whereby the latter are forced to turn simultaneously about their axes.

43. In an aircraft, a propeller having a hub formed with radially disposed sockets, angularly adjustable blades mounted in said sockets, said hub having a bore extending entirely therethrough for the accommodation of a driving shaft, operable to rotate said propeller, a rigid member carried by and projecting from the base of each blade radial to the axis of angular adjustment, a rotatably mounted member, movable relatively with respect to said hub upon angular adjustment of said blades, and articulated driving connections between said members and sleeve, whereby angular adjustment of any one of said blades effects relative movement of said rotatable member with respect to said propeller hub, to transmit said angular adjustment to the other of said blades.

44. In an aircraft propeller, comprising: a hub; a blade rotatably mounted in said hub, and asymmetric with respect to its longitudinal axis, whereby the unbalanced air pressure due to propeller rotation tends to rotate said blade about its longitudinal axis; and means, operable substantially parallel with respect to the plane of rotation of said propeller and laterally with respect to the longitudinal axis of said blade, opposing the rotation of said blade caused by the unbalanced air pressure developed thereon.

45. In an aircraft propeller, comprising: a hub; blades rotatably mounted in said hub, said blades being asymmetric with respect to their longitudinal axes, whereby the unbalanced air pressure due to propeller rotation tends to rotate said blades about their longitudinal axes; and spring means for each of said blades, operable substantially parallel with respect to the plane of rotation of said propeller and laterally with respect to the longitudinal axes of said blades, opposing the rotation of said blades caused by the unbalanced air pressure thereon.

46. In an aircraft propeller, comprising: a hub; a blade rotatably mounted in said hub, asymmetric with respect to its longitudinal axis, whereby the unbalanced air pressure due to propeller rotation tends to rotate said blade about its longitudinal axis; and means arranged exteriorly of said hub, operable substantially parallel with respect to the plane of rotation of said propeller and laterally with respect to the longitudinal axis of said blade, opposing the rotation of said blade caused by the unbalanced air pressure developed thereon.

47. A propeller, comprising: a hub having a plurality of blade sockets; a plurality of blades, each having a base portion rotatably mounted in one of said blade sockets; an equalizing member rotatably mounted with respect to said hub, movable relatively with respect to said hub, and having radially extending arms, one for each of said blades, said arms having a socketed portion at each extremity thereof; a member rigidly secured to the base portion of each of said blades, and each having a spherical head rotatably mounted in the socketed portion of each of said arms, whereby said equalizing member causes said blades to rotate simultaneously in their sockets; a plurality of lugs carried by said hub; and a spring for each of said blades, each spring being interposed between one of said lugs and one of said rigidly mounted members, said springs tending to hold their associated blades at a predetermined pitch, and to oppose the rotation of said blades about their longitudinal axes.

48. A propeller, comprising: a hub having a plurality of blade sockets; a plurality of blades, each having a base portion rotatably mounted in one of said blade sockets, said blades being asymmetric with respect to their longitudinal axes, whereby the unbalanced air pressure due to propeller rotation tends to rotate said blades about their longitudinal axes; an equalizing member rotatably mounted with respect to said hub, movable relatively with respect to said hub, and having radially extending arms, one for each of said blades, said arms having a socketed portion at each extremity thereof; a member rigidly secured to the base portion of each of said blades, and each having a spherical head rotatably mounted in the socketed portion of each of said arms, whereby said equalizing member causes said blades to rotate simultaneously in their sockets; a plurality of lugs carried by said hub; and a spring for each of said blades, each spring being interposed between one of said lugs and one of said rigidly mounted members, said springs tending to hold their associated blades at a predetermined pitch, and to oppose the rotation of said blades about their longitudinal axes caused by the unbalanced air pressure thereon.

49. A propeller, comprising: a hub having a plurality of blade sockets; a plurality of blades, each having a base portion rotatably mounted in one of said blade sockets, said blades being asymmetric with respect to their longitudinal axes, whereby the unbalanced air pressure due to propeller rotation tends to rotate said blades about their longitudinal axes; an equalizing member rotatably mounted with respect to said hub, movable relatively with respect to said hub, and having radially extending arms, one for each of said blades; a member rigidly secured to the base portion of each of said blades; mechanical connecting means connecting said arms and said rigid members, whereby said equalizing member causes said blades to rotate simultaneously in their sockets; and a spring for each of said blades, said springs tending to hold their associated blades at a predetermined pitch, and to oppose the rotation of said blades about their longitudinal axes caused by the unbalanced air pressure thereon.

50. A propeller, comprising: a hub having a plurality of blade sockets; a plurality of blades, each having a base portion rotatably mounted in one of said blade sockets, said blades being asymmetric with respect to their longitudinal axes, whereby the unbalanced air pressure due to propeller rotation tends to rotate said blades about their longitudinal axes; an equalizing member rotatably mounted with respect to said hub, movable relatively with respect to said hub, and having radially extending arms, one for each of said blades; a member rigidly secured to the base portion of each of said blades; articulated connections connecting said arms and said rigid members, whereby said equalizing member causes said blades to rotate simultaneously in their sockets; a plurality of lugs carried by said hub; and a spring for each of said blades, each spring being interposed between one of said lugs and one of said rigidly mounted members, said springs tending to hold their associated blades at a predetermined pitch, and to oppose the rotation of said blades about their longitudinal axes caused by the unbalanced air pressure thereon.

51. A propeller, comprising: a hub having a plurality of blade sockets, and each having a slot in the walls thereof; a plurality of blades, each having a base portion rotatably mounted in one of said blade sockets, said blades being asymmetric with respect to their longitudinal axes, whereby the unbalanced air pressure due to propeller rotation tends to rotate said blades about their longitudinal axes; an equalizing member rotatably mounted with respect to said hub, movable relatively with respect to said hub, and having radially extending arms, one for each of said blades; said arms having a socketed portion at each extremity thereof; a member rigidly secured to the base portion of each of said blades and projecting through said slots; articulated connections connecting said rigid members and said arms, whereby said equalizing member causes said blades to rotate simultaneously in their sockets; and a spring for each of said blades, tending to hold their associated blades at a predetermined pitch, and to oppose the rotation of said blades about their longitudinal axes caused by the unbalanced air pressure thereon.

52. A variable pitch propeller, comprising: a hub; blades rotatably supported by said hub; studs operatively connected to said blades; means rotatably mounted on said studs; and elongated elements, having portions thereof connected to said rotatable means, for anchoring said blades to said hub, said elements acting to take up centrifugal stresses tending to throw said blades from said hub, and said means being rotatable about said studs, whereby said elements are movable with respect to said hub to permit rotatable movements of said blades with respect to said hub.

53. A variable pitch propeller, comprising: a hub; blades rotatably supported by said hub; a plurality of elongated elements each individually anchoring said blades to said hub, said elements acting independently entirely to take up centrifugal stresses tending to throw said blades from said hub, and each individually movably connected to said blades, whereby said elements are movable with respect to each other and to said hub to permit rotatable movements of said blades with respect to said hub.

54. A variable pitch propeller, comprising: a hub; blades rotatably supported by said hub; a plurality of elongated elements each individually anchoring said blades to said hub, said elements acting independently entirely to take up centrifugal stresses tending to throw said blades from said hub, and each individually movably connected to said blades, whereby said elements are movable with respect to each other and to said hub to permit rotatable movements of said blades with respect to said hub; and means independent of said elements for imparting rotational movement to said blades.

55. In an aircraft propeller, comprising: a hub; a blade rotatably mounted in said hub, rotatable about its longitudinal axis due to the pressure developed thereon during propeller rotation; and means disposed substantially parallel with respect to the plane of rotation of said propeller and laterally with respect to the longitudinal axis of said blade, and operable, independently of the centrifugal force developed due to propeller rotation, to oppose rotation of said blade about its longitudinal axis.

ALBERT P. WIEGAND.

CERTIFICATE OF CORRECTION.

Patent No. 1,956,055.   April 24, 1934.

ALBERT P. WIEGAND.

It is hereby certified that error appears in the printed specification of the above numbered patent requiring correction as follows: Page 3, lines 10 and 11, claim 2, strike out the words "blades against radial movement due to centrifugal force"; page 7, line 41, claim 42, strike out "to" first occurrence; and that the said Letters Patent should be read with these corrections therein that the same may conform to the record of the case in the Patent Office.

Signed and sealed this 19th day of June, A. D. 1934.

Bryan M. Battey (Seal)   Acting Commissioner of Patents.